May 10, 1966 — C. W. MODERSOHN — 3,250,668
PULP MOLDING ASSEMBLY INCLUDING PRESSING BLADDER
Filed Sept. 27, 1963 — 2 Sheets-Sheet 1
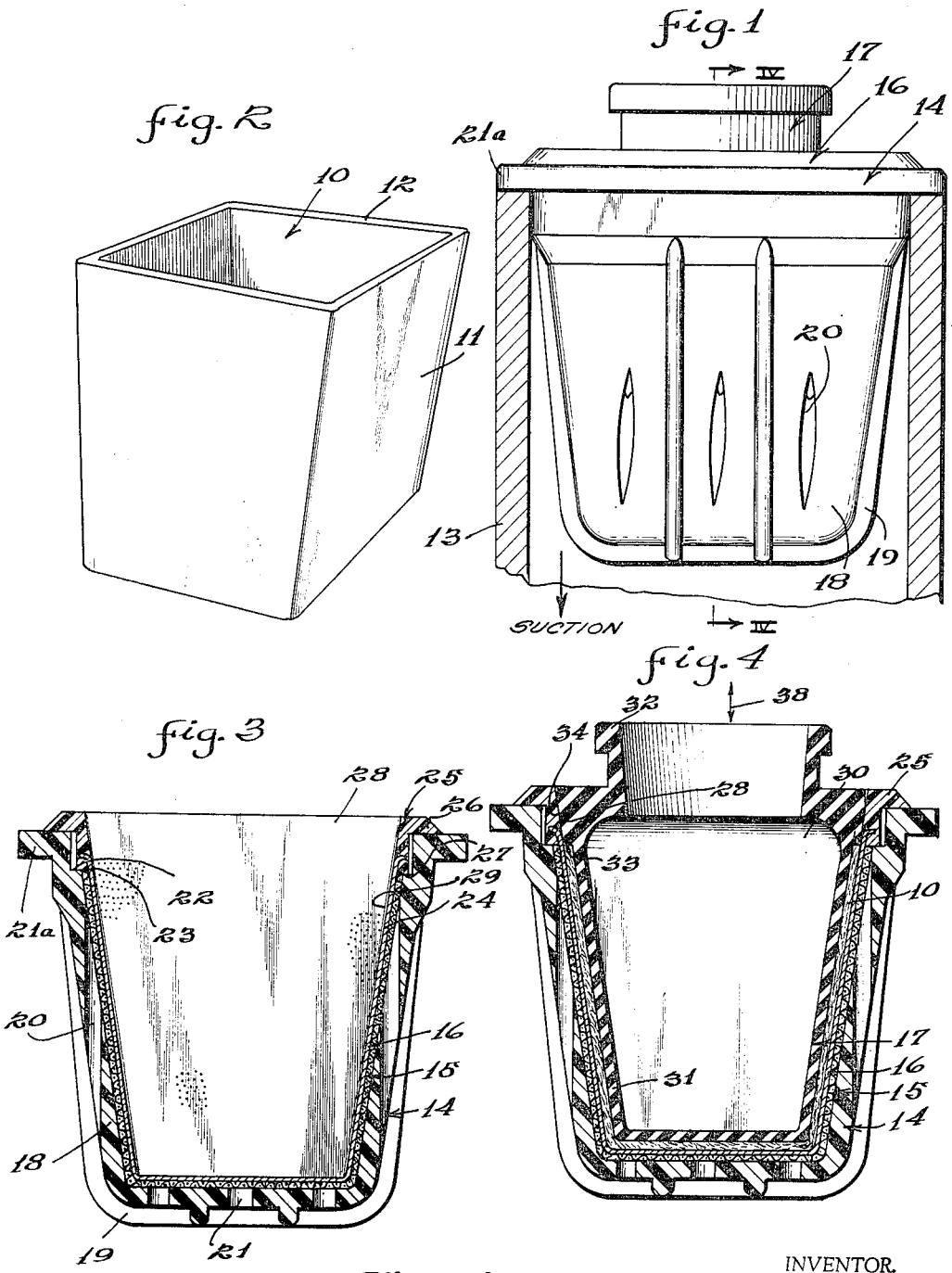
INVENTOR.
Charles W. Modersohn
BY
Hill, Sherman, Meroni, Gross & Simpson
ATTORNEYS

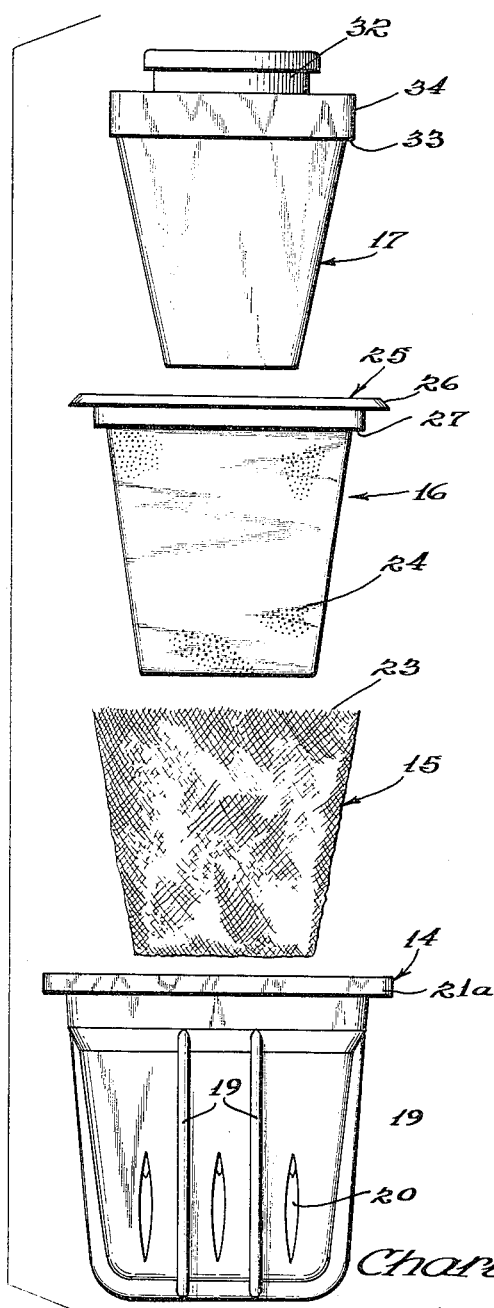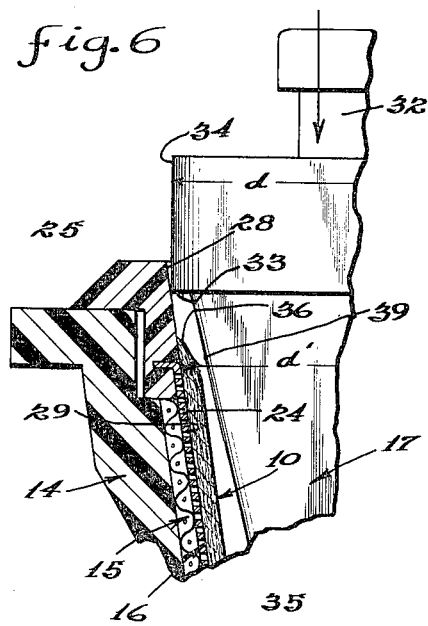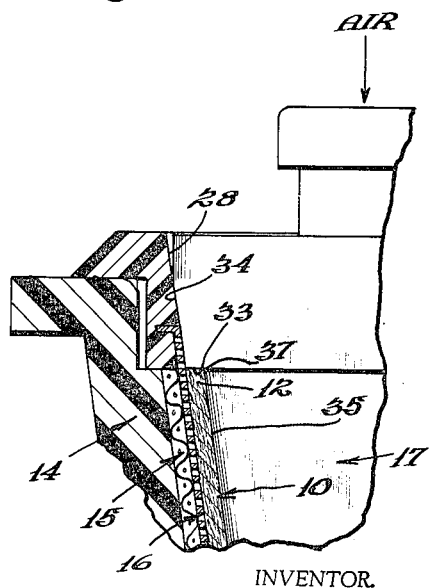

United States Patent Office 3,250,668
Patented May 10, 1966

3,250,668
PULP MOLDING ASSEMBLY INCLUDING
PRESSING BLADDER
Charles W. Modersohn, Beloit, Wis., assignor to Beloit
Corporation, Beloit, Wis., a corporation of Wisconsin
Filed Sept. 27, 1963, Ser. No. 312,133
10 Claims. (Cl. 162—220)

The present invention relates to improvements in pulp molding mechanisms, and more particularly to a mold assembly used in a machine for molding pots such as seed pots and other articles such as egg cartons, flower pots and the like at a relatively high production rate and with reliability as to quality and continuity of operation.

The mold assembly is used in a molding machine, preferably of the type for continuous automatic operation, wherein a porous mold surface is exposed to a slurry containing pulp suspended in a liquid and a molded article is formed on the surface thereof by creating a suction on the backside of the mold for drawing fluid through the mold wall. The article is subsequently further dewatered and dried and removed from the mold. The present invention contemplates providing a mold assembly including an outer support housing adapted for having a suction or vacuum therein, a rigid outer container or basket supported on the housing and having fluid passages therethrough, a screen liner for the basket for distributing the suction applied, a concave fluid permeable mold within the screen liner for forming a pulp article on the inner surface, a smooth surface leading to the inner surface of the mold, and an inflatable bladder for insertion into the mold having a wiping shoulder for engaging the smooth surface and forming a rigid smooth upper edge on the mold.

In the formation of molded pulp pots or containers such as seed pots, egg cartons, flower pots and the like it is essential to provide an article which can be formed at a relatively high speed and yet which is relatively strong and durable, is not subject to damage from packing or handling, which is of uniform thickness throughout for the saving of pulp material and for optimum strength, and particularly which has a uniform strong well appearing upper edge. These physical features for a pot have been hard to obtain under rapid high speed molding conditions in that nonuniform pressure differentials across the mold surface create nonuniform deposits of layers of stock, and in that the pulp gathers in an uneven feathered layer at the top of the mold where the porous wall meets a rigid impervious surface. While a nonuniform feathered edge is acceptable in an article such as a seed pot, it is not desirable and a finished strong article must be provided to be fully satisfactory for a multitude of purposes and to be competitive with containers formed of other materials.

It is accordingly an object of the present invention to provide an improved mold assembly and method of making a pulp article therewith which provides a molded pulp container having a particularly strong, uniform smooth upper edge which is flat and which extends at right angles to the container.

A further object of the invention is to provide an improved mold assembly for making a pulp article wherein the edge of the pulp article is uniform and the seemingly inherent disadvantage of feathering of the edge of the article at the edge of the mold is avoided.

A still further object of the invention is to provide an improved mold assembly for providing more uniform wall thickness of a molded article made thereon.

A still further object of the invention is to provide an improved molded pulp article having a stronger wall and upper edge.

Other objects, advantages and features will become more apparent with the teaching of the principles of the present invention in connection with the disclosure of the preferred embodiment thereof in the specification, claims and drawings, in which:

FIGURE 1 is a elevational view with portions broken away of a mold assembly constructed and operating in accordance with the principles of the present invention;

FIGURE 2 is a perspective view of a molded article in accordance with the present invention;

FIGURE 3 is a sectional view illustrating the assembly of the parts at the time the molded article is being formed;

FIGURE 4 is a vertical sectional view showing the assembly of the parts as the molded article is being completed, with the view taken substantially along line IV—IV of FIGURE 1;

FIGURE 5 is an exploded view of the parts of the mold assembly;

FIGURE 6 is an enlarged fragmentary detailed view showing the bladder of the mechanism being moved into place; and FIGURE 7 is a detailed fragmentary sectional view showing the bladder fully moved into place.

As shown on the drawings:

A molded pulp container 10 is shown in FIGURE 2 formed of pulp fibers such as by being deposited on the surface of a fluid permeable mold from a 1% stock suspension. The molded pulp article 10 has been compacted and dried and is shown in the form of a container such as a flower pot. The walls 11 are of deposited, dewatered and dried pulp, and the upper edge or top 12 of the container is rigidly formed in a flat upwardly facing surface. It will readily be seen that the strength of the container must rely largely on the strength of its upper edge and that deterioration is likely to start at this location, particularly during stacking and handling. In accordance with the principles of the present invention the upper edge 12 is smooth and uniform, and preferably flattened, being formed of pulp compacted at least as solidly as the other pulp of the container and preferably compacted more solidly than the pulp of the wall 11.

A mold assembly for making the pulp article 10 is shown assembled in FIGURE 1 as it appears during the time the article is being compressed. The assembly is supported in a housing member 13 provided with means for creating a suction therein. In one form the housing member 13 will be supported on a turret or drum such as that shown in the copending application Serial No. 88,401, which carries the mold into a slurry of pulp stock for forming the article and then through a series of further forming stations wherein the article is further dewatered by being pressed and dried and then extracted from the mold.

As illustrated in FIGURES 3 through 5, the mold assembly includes an outer basket 14 which forms a container that is supported on the housing 13.

Within the basket is a screen liner 15 which functions to distribute the vacuum applied to the mold to insure more uniform distribution of suction and insure that the suction is substantially uniform over the mold surface.

Within the liner is the mold 16 for forming the article 10 on the inner surface.

For pressing water from the article within the mold a rubber bladder 17 is provided, and these parts assemble in the manner illustrated in FIGURE 5 being sized to fit together in assembly as shown in FIGURE 4.

The basket is molded of a material such as a hard plastic and has an outer wall 18 with strengthening ribs 19 thereon. The wall is tapered inwardly toward a bottom, and vertical passages 20 extend from the outer surface to the inner surface for applying suction to the mold within. Openings 21 are also provided in the bottom of the basket.

At the upper edge of the basket is a laterally extending flange 21a for seating the basket on the housing to which it is clamped by suitable means, not shown, and within the basket is an upwardly facing shoulder 22.

The screen 15 is preferably shaped to fit within the basket and therefore to be uniformly located with respect to the inner surface of the basket wall, and the upper edge 23 of the screen extends to be even with the shoulder 22. The screen is preferably formed of a heavy wire woven to a mesh with smaller openings than the passages 20 and 21 in the basket.

The mold 16 is preferably formed of a thin metal wall 24 with evenly spaced perforations therein for the smooth flow of water through the mold wall and the smooth formation of the molded article. The inner surface 29 of the mold is smooth for the formation of a smooth surfaced article. The metal mold is secured at its upper edge to a ring 25 having a laterally upwardly extending flange 26 which seats on top of the flange 21a of the basket. The flange is preferably of molded hard plastic so that the upper edge of the mold wall 24 is slightly turned outwardly and embedded within the plastic of the ring 25.

The ring has a downwardly facing shoulder 27 which seats on top of the shoulder 22 of the basket and also holds the screen liner 15 in place.

The mold ring 25 has an inner smooth imperforate surface 28 which is formed to be coplanar with the inner surface 29 of the mold, and which tapers inwardly at substantially the angle of the mold.

The bladder 17 is made of an elastic material such as rubber so that air pressure introduced into the interior will inflate the bladder against the formed article 10, in the manner illustrated in FIGURE 4, for squeezing water from the article 10. For this purpose the bladder has a hollow inner chamber 30, and has a neck portion 32 shaped to connect to a support provided with an air duct for inflating the bladder, and the support, indicated schematically by the arrowed line 38 is provided with suitable means for moving the bladder axially into and out of the mold.

The bladder has a heavier upper flange portion with an outwardly facing smooth surface 34 providing a downwardly facing forming shoulder 33. The outer surface 34 of the flange slides against the smooth imperforate surface 28 of the ring 25 when the bladder is inserted in the manner illustrated in FIGURE 6.

During formation of the molded article, and before insertion of the bladder 17, the molded article will be deposited on the inner surface 29 of the mold. At the upper edge of the mold wall 24 where it joins the smooth imperforate surface 28 the layer 35 of pulp will overlap or feather over onto the smooth surface 36. In methods heretofore used this feathered portion was left to form a slightly tapered edge or was cut-off at a later time.

In accordance with the present invention the edge 36 is compressed downwardly to form a flat upwardly facing surface 37 in the manner shown in FIGURE 7.

For accomplishing this the outer surface 34 has a lateral dimension d greater than the lateral dimension d' at the base 39 where the smooth imperforate surface 28 joins the surface 29 of the mold. Thus the shoulder 33 at the base of the bladder flange will come downwardly with a wiping action against the surface 28 wiping the feathered material 36 downwardly and compacting it to form an upwardly facing shoulder 37 of substantially compressed pulp. This provides the foundation for the rigid square upper edge 12 of the container 10.

The upper edge 37 is held compacted while the bladder is inflated. The bladder is then deflated and moved axially upwardly out of the mold leaving a compressed dewatered pulp mold with a compressed rigid square upper edge 12.

In summary of operation, the mold assembly as shown in FIGURE 3 is handled so that a slurry of pulp will be introduced into the interior of the mold 16 forming a layer 35, FIGURE 7, on the inner surface 29 of the mold. When this is completed the mold is removed from the slurry, and the bladder 17 is introduced axially into the mold with the downwardly facing shoulder 33 extending to substantially fill the inside of the ring 25. Preferably the bladder is of a size so that its outer surface 34 completely fills the ring at the top thereof, so that it moves downwardly into the ring 25 with a squeegee action wiping the surface 28 clean and forming the upwardly facing shoulder 37, FIGURE 7 of the molded article 10. The bladder is then inflated pressing the wall 35 of material and further compressing the upper edge 12 of the article, and the bladder is then deflated and axially removed. Thereafter the mold 10 will be dried, such as by introducing heated air into the interior of the mold and drawing it through the mold, and the article 10 is thereafter removed from the mold.

Thus it will be seen that I have provided an improved mold assembly and method of producing molded articles of improved construction. The features of the invention meet the objectives, advantages and perform the operations above set forth. The structure provides a compact unit which is substantially self-cleaning and is capable of operation with automatic machines for repeatedly forming molded articles. It will of course be appreciated that articles of different shapes can be molded and that multiple articles can be formed utilizing the principles and features of the invention.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. A molding assembly for making pulp articles comprising in combination
    an air tight outer support housing connected to a source of vacuum,
    a rigid outer container supported on said housing and having fluid passages therethrough,
    a screen liner for said outer container for distributing the pressure differential caused by the vacuum through said passages,
    a concave fluid permeable mold within said screen liner for forming a pulp article on the inner surface thereof and having a tapered impermeable surface area at the entry to said mold,
    an inflatable bladder for insertion into the mold for pressing liquid from the article,
    and a wiping shoulder on said bladder slidably engageable with said tapered impermeable surface with insertion of the bladder into the mold.

2. A molding assembly for making pulp articles comprising in combination
    an air tight outer support housing connected to a source of vacuum,
    a rigid outer container supported on said housing and having fluid passages therethrough,
    a heavy woven wire, shaped screen liner supported on the inner surface of the container,
    a concave fluid permeable mold within and supported on said screen liner for forming a pulp article on the inner surface thereof and having a tapered impermeable surface area at the entry to said mold,
    an inflatable bladder for insertion into the mold for pressing liquid from the article,
    and a wiping shoulder on said bladder slidably engageable with said tapered impermeable surface with insertion of the bladder into the mold for forming a shoulder on said article.

3. In a molding assembly the combination comprising, a hollow mold having a fluid permeable wall for drawing fluid therethrough to deposit material on the inner surface thereof, a wall having a tapered impermeable surface leading into said mold and adjoining the mold surface so that material deposited on the mold surface overlaps said impermeable surface, and a wiper member movable along said tapered impermeable surface toward said mold surface forming a shoulder at the edge of an article being molded.

4. In a molding assembly the combination comprising, a hollow mold having a tapered impermeable surface and a wall with a fluid permeable area extending from said tapered surface for drawing fluid therethrough to deposit material in fluid suspension on the inner surface thereof, and a wiper member movable into said mold over the tapered surface for forming a shoulder on the edge of an article formed in said mold.

5. In a molding assembly the combination comprising, a hollow mold having a fluid permeable wall for drawing fluid therethrough to deposit material on the inner surface thereof, a wall having a tapered impermeable surface leading into said mold and adjoining the mold surface so that material deposited on the mold surface overlaps said tapered impermeable surface, an inflatable bladder insertable into said mold for pressing an article formed on the inner surface thereof against said inner surface, and a shoulder on said bladder positioned to slide along said tapered impermeable surface as the bladder moves into the mold for wiping said impermeable surface and forming a shoulder on the edge of an article being molded.

6. In a molding assembly the combination comprising, a hollow mold having a fluid permeable wall for drawing fluid therethrough to deposit material on the inner surface thereof, a smooth inwardly tapered surface surrounding the entry opening of the mold at the edge of said mold and being coplanar with said inner surface, An inflatable bladder insertable into said mold for pressing an article formed on the inner surface thereof against said surface, and a shoulder on said bladder having an outer lateral dimension intermediate in value to the least and to the greatest lateral dimension of said tapered surface so that said shoulder will slantingly engage said tapered surface, said shoulder and said bladder being compressed as said shoulder slides along said tapered surface, said shoulder having a surface facing the mold for forming an edge shoulder on the article being molded.

7. In a mold assembly the combination comprising, a concave mold having a tapered impermeable surface and a fluid permeable wall extending from said tapered surface, a container enclosing and supporting said mold and having individual fluid flow openings therein, and a fluid pressure differential distributing wall between said mold and said container having openings smaller than said fluid flow openings.

8. A molding assembly for making pulp articles comprising in combination, an outer support housing, means for generating a suction therein, a rigid plastic basket supported on said housing and having a supporting laterally outwardly extending flange on its upper edge with vertically extending ribs, the wall of said basket being tapered inwardly toward the lower end with vertically extending passages formed in said wall opening at the outer and inner surfaces thereof and openings formed in the bottom of said basket, a screen liner positioned within said basket, a concave perforate metal mold within said screen liner for forming a pulp article on the inner surface thereof secured at its upper edge to a plastic ring having a smooth inner impermeable surface tapering inwardly and extending substantially coplanar with the inner surface of the mold and provided with a laterally outwardly extending annular flange for resting on the flange of said basket and further having a downwardly facing shoulder at the lower edge of said ring, said basket having an upwardly facing shoulder for engaging the shoulder of said ring, and an inflatable bladder tapered to conform to the inner surface of said mold and having an annular outwardly projecting flange forming a downwardly facing shoulder of a lateral dimension intermediate in value to the least and to the greatest lateral dimension of said ring for wipingly engaging the inner surface of said ring as the bladder is being inserted and extending to the edge of said mold for forming a shoulder on the upper edge of an article being formed within said mold.

9. The method of forming a molded article on the surface of a fluid permeable wall having an adjoining coplanar tapered impermeable surface which comprises, creating a pressure differential across said permeable wall for depositing a layer of material suspended in a fluid carrier on the surface of the permeable wall, wiping overhanging material off said tapered impermeable surface thus forming a shoulder at the edge of an article being formed, and holding the material of said shoulder while pressing it against the surface of said permeable wall.

10. The method of forming a molded article on the surface of a fluid permeable wall having an adjoining coplanar tapered impermeable surface which comprises, creating a pressure differential across the permeable wall for depositing a layer of material suspended in a fluid carrier on the surface of the permeable wall, wiping overhanging material off said tapered impermeable surface to the edge of said permeable wall thus forming a shoulder on an article being formed, supporting the shoulder in an axial direction at substantially right angles to the wall, and maintaining the support on the shoulder while pressing the article formed against the permeable wall.

References Cited by the Examiner

UNITED STATES PATENTS

| | | | |
|---|---|---|---|
| 240,091 | 4/1888 | Chase | 162—401 X |
| 1,748,865 | 2/1930 | Chaplin | 229—2.5 |
| 1,838,761 | 12/1931 | Hall | 229—2.5 |
| 1,907,795 | 5/1933 | Hall | 162—228 |
| 2,734,430 | 2/1956 | Kletzien | 162—228 |
| 2,922,476 | 1/1960 | Koxvold | 162—392 |
| 2,948,337 | 8/1960 | Wolter | 162—392 |
| 2,958,623 | 11/1960 | Harshberger | 162—220 X |

FOREIGN PATENTS

| | | |
|---|---|---|
| 571,117 | 2/1959 | Canada. |

DONALL H. SYLVESTER, *Primary Examiner.*

FRANKLIN T. GARRETT, HOWARD R. CAINE, *Examiners.*

J. H. NEWSOME, *Assistant Examiner.*